Nov. 13, 1928.  1,691,644
J. S. CURRAN
MECHANICAL MOVEMENT
Filed April 6, 1928
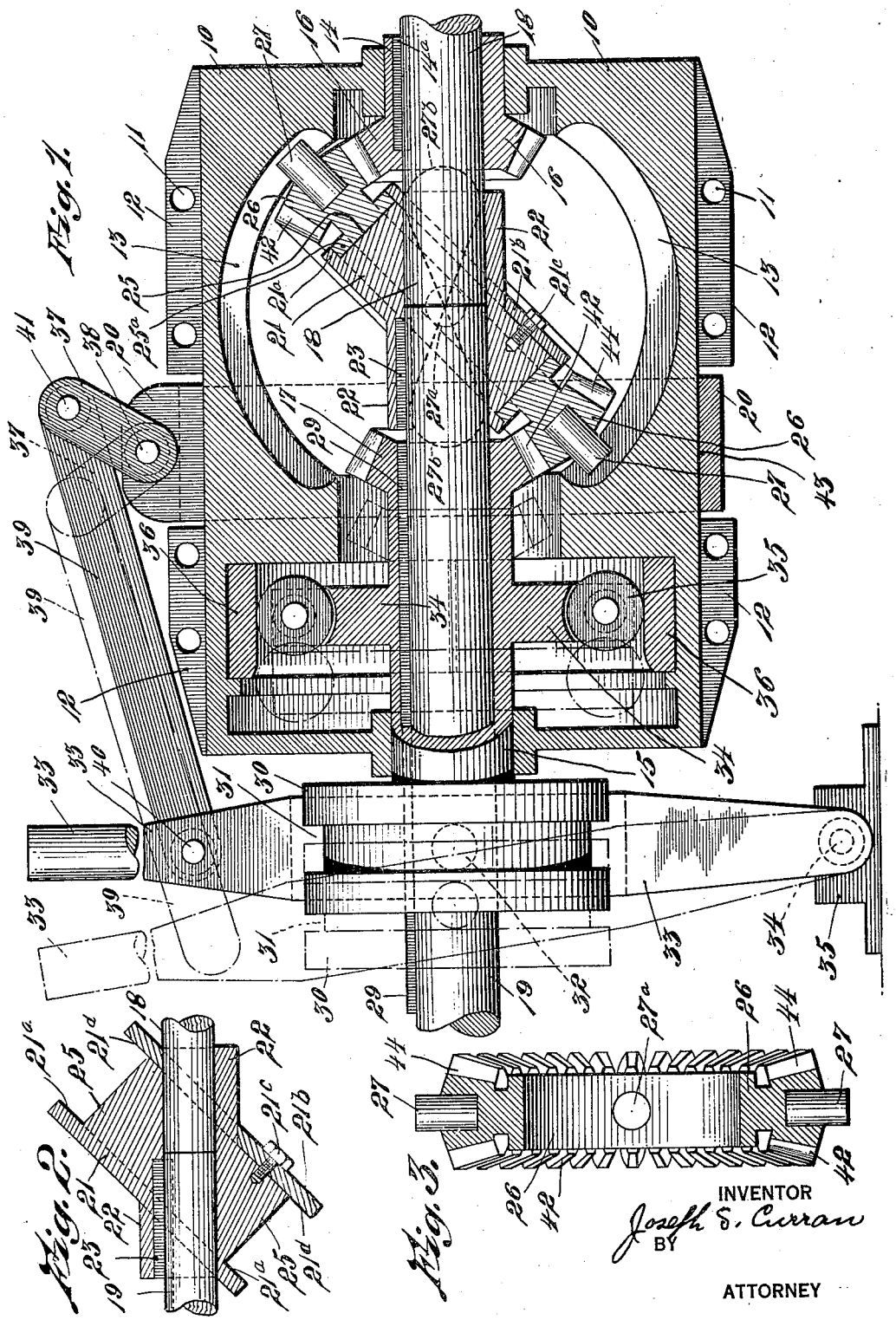
INVENTOR
Joseph S. Curran
BY
ATTORNEY Patented Nov. 13, 1928.

1,691,644

UNITED STATES PATENT OFFICE.

JOSEPH S. CURRAN, OF PROVIDENCE, RHODE ISLAND.

MECHANICAL MOVEMENT.

Application filed April 6, 1928. Serial No. 267,979.

This invention relates to improvements in mechanical movements; and has for its object to provide mechanism by which I obtain certain mechanical movements to be utilized for purposes for which it may be adapted, this mechanism including a cam journal member mounted on and driven by a shaft, the working peripheral face of this journal member being set on an angle to the axis of the shaft and on this cam journal is mounted a double bevel gear member which slides on the periphery of the cam journal member when being held against rotation by a guide which permits a longitudinal motion of the guided portion thereof during the rotation of the cam journal member.

A further object of the invention is the provision of a clutch mechanism including a rotatably mounted sectional casing having a longitudinally disposed guide therein and in this casing is mounted a cylindrical cam journal member which is fixed to a driving shaft and on this cam journal I have mounted a double bevel gear which serves to impart a rotating motion to a pinion mounted on a second shaft, whereby the rotation of either of these shafts will rotate the other in an opposite direction when the casing is held, or a combined unitary rotation of the casing with either shaft will transmit rotation at the same speed to the other shaft.

A further object of the invention is the provision of mechanism including a pinion mounted on and slidably keyed to the shaft to which is fixed the cam journal to provide a positive rotation of the casing and the other shaft.

A still further object of the invention is of a mechanism including a shaft, a cam journal mounted thereon, a means adapted to be held against rotation and having an arcuately shaped longitudinally disposed guide groove therein, a means mounted on the cam journal and having pins in engagement with said grooves, whereby rotation of said shaft will cause said pins to oscillate, or an oscillating motion of said pins will transmit rotation to said shaft.

With these and other objects in view, the invention consists of certain novel features of construction as will be more fully described and particularly pointed out in the appended claims.

In the accompanying drawings:

Figure 1 is a side elevation of my improved mechanism with one of the halves of the casing removed showing the mechanism as mounted therein.

Figure 2 is a sectional side elevation of the cam journal member as mounted on two shafts.

Figure 3 is view of a portion of the double bevel gear partly in section and partly in detail showing a trunnion as mounted thereon intermediate the pins also mounted thereon.

In the usual clutch mechanism which uses a friction means in conjunction with a driving shaft to rotate another shaft through a co-operating casing, there is a possibility of a slippage between said shafts, which would cause a noncontinuous motion of the driven shaft at the same speed of the driving shaft, but by my improved mechanism there is a positive continuous motion of both shafts when being driven in the same direction, yet said shafts are adapted to be driven at the same or different speeds in an opposite direction and the following is a detailed description of the present embodiment of my invention and showing one construction of mechanism by which these advantageous results may be accomplished:—

With reference to the drawings, 10 designates the casing which may be cylindrical in cross section and preferably made in halves and the halves secured together by bolts passed through the holes 11 in the flanges 12 which extend outwardly from said casing and provided therefor. The casing may have a partly spherically shaped central opening, in the upper and lower walls of which I have formed guide grooves 13 for the purpose presently described and the ends of this cylindrical casing are bored to receive the hubs 14 and 15 of pinions 16 and 17 respectively which provide bearings one for shaft 18 and the other for shaft 19.

On the inner ends of these shafts 18 and 19 is mounted a cam journal 21 which is provided with hubs 22 bored to receive the ends of said shafts 18 and 19, shaft 19 being keyed as at 23 to this cam journal 21, while the end of shaft 18 runs freely therein. This cam journal also being provided with annular flanges 21$^a$ formed integral therewith and on the opposite end of this cam journal I have provided a disk member 21$^B$ fastened thereto by bolts 21$^c$, said disk extending radially beyond the periphery 25 of this cam journal to provide flanges 21ᵈ said flanges 21ᵈ and 21ᵃ providing means to prevent relative lateral movement of the double bevel gear 26 on said cam journal 21.

This cam journal is set with its working peripheral face 25 at an angle to the axis of the shaft on which it is mounted and on this cam journal I have mounted the hub 25ᵃ of the double beveled gear 26 which is shown as being connected to the casing through the guide groove 13 and the pin 27 fixed to the gear 26 whereby the gear is held against rotation relatively to the casing 10 but is permitted a swinging or twisting rotary oscillating motion at right angles to the axis of the shaft. Pinion gear 17 is shown as being mounted on and slidably keyed to shaft 19 and being provided with an elongated hub 15 having a slot to be engaged by the key 29; this hub also being enlarged adjacent its outer end to provide a spool member 30, formed integral therewith and said spool having an annular groove 31 to receive the pins 32 of the operating lever 33 which is pivotally anchored as at 34 to an anchoring member 35 provided therefor. On the elongated hub 15 of pinion 17 and intermediate said pinion and the spool 30 I have formed the arm members 34 which carry the rollers 35 which are adapted to expand the internal friction band 36 which serves to rotate the casing 10 through shaft 19 when desired, which band when in normal position is adapted to permit the casing 10 to be held against rotation by the external friction band 20 which is provided with a tongue member 37 pivotally connected thereto as at 38 said tongue member 37 being connected to the operating lever 33 through the connecting member 39 which is pivotally connected to said tongue member 37 as at 41 and to said lever as at 40.

When shaft 19 and cam journal 21 are rotated and the casing 10 is held against rotation by moving the operating handle of the lever 33 in an endways direction away from the casing said lever through pins 32 move the spool in the same direction away from the casing and the arms 34 remove the rollers from the internal friction band 36 which then relaxes or contracts to normal position and the pinion 17 is disengaged from the teeth 42 of the double bevel gear 26, the endwise motion of the lever 33 through the connecting member 39 and tongue member 37, causing the external friction band 20 to tightly grip the peripheral surface 43 of the casing 10, said stationary casing and rotating shaft and cam journal causing the double bevel gear 26 which is mounted on said cam journal to receive a wabbling motion, thus causing the teeth 44 of this double bevel gear which engage the teeth of the pinion 16 keyed to the shaft 18 to rotate this pinion 16 in the opposite or reverse direction and through it drive the shaft 18 at a speed according to the gear ratio of said pinion and the double bevel gear teeth meshing therewith.

When the operating lever 33 is moved toward the casing 10, the spool 30 is caused through pins 32 engaging the groove 31 to be moved in the same direction, the rollers 35 through arms 34 will engage and expand the internal friction band 36 and the teeth of pinion 17 will engage the teeth 42 of the double bevel gear 26 and thereby when the shaft 19 is rotated, it will rotate the casing 10, through the pin 27 in the double bevel gear 26 the teeth 44 of which engage the teeth of the pinion 16 keyed to the shaft 18, to positively rotate this shaft at the same speed and in the same direction.

When the casing 10 is held against rotation and the double bevel gear disengaged from the pinion 17 and the rollers removed from engagement with the internal friction band, rotation of either shaft will rotate the other in an opposite direction and cause the double bevel gear to receive a wabbling motion and the pin 27 to oscillate in the guide groove 13 and the trunnion 27ᵃ which is fixed to said double bevel gear and extends in a direction at right angles to said pin 27 to have imparted thereto a figure 8 motion as illustrated by dot-dash lines 27ᴮ in Figure 1, or an oscillating motion of the pin 27 will cause said shafts 18 and 19 to be rotated simultaneously in opposite directions and said trunnion 27ᵃ to describe a figure 8 motion.

My improved mechanical movements are extremely simple in construction and by their use a great variety of results not heretofore obtained may be readily produced.

By the term "gear" in the specification and claims, I mean either a gear with teeth or a gear blank, or a construction which does not have teeth cut thereon.

By the term "casing" I mean an inclosure for the cam journal and its adjacent structure, or a skeleton frame structure, adapted to have mounted thereon and also therein suitably operated friction bands, 20 and 36 one to rotate and the other to hold said casing against rotation.

The foregoing description is directed solely towards the construction illustrated, but I desire it to be understood that I reserve the right and privilege of resorting to all the mechanical changes to which the device is susceptible, the invention being defined and limited only by the terms of the appended claims.

I claim:

1. In mechanical movements, a rotatable sectional casing having opposed aligned bearings therein, internal arcuately shaped guide grooves in said casing, a shaft journaled in said casing having a cam journal member formed integral therewith or fixed thereto with its working peripheral face set on an angle to said shaft, a toothed gear rotatably mounted on said journal member and having means in engagement with said groove to hold said gear against rotation relative to said casing but adapted to impart a unitary motion to said gear with said casing, an internal friction band mounted in said casing, an operating lever and means associated therewith slidably keyed to said shaft and having means to expand said friction band to rotate said casing, an external friction band mounted on said casing and connected to said operating lever for holding said casing against rotation, a second shaft journaled in said casing, a pinion gear fixed to said shaft in engagement with said toothed gear to connect said shafts, whereby rotation of said shaft and cam journal member when said internal friction band is expanded will rotate the casing and other shaft in the same direction, or when said casing is free from frictional engagement with said internal friction band and held against rotation by said external friction band rotation of the shaft and pinion will rotate the shaft and cam journal member in the opposite or reverse direction.

2. In a one way clutch mechanism, a cylindrical casing, means to rotate said casing, co-acting bearings in said casing for holding two shafts in axial alignment, longitudinally disposed arcuately shaped guide grooves in said casing, a shaft in said casing, a cylindrical cam journal fixed to said shaft with its working peripheral face set on an angle to said shaft, a double faced bevel toothed gear slidably and rotatably mounted on said cam journal, means to prevent relative lateral movement of said double bevel gear on said cam journal, means co-acting with said grooves for holding said double bevel gear from rotation relative to said casing but adapted to impart a unitary motion to said gear with said casing, means for holding said casing from rotation, a pinion gear slidably keyed to said shaft to be engaged with or disengaged from said double bevel gear, means to cause said gears to be engaged or disengaged, a second shaft in said casing, a second pinion in said casing, said second pinion being fixed to said second shaft and operatively connecting said shafts through said double bevel gear and cam journal when said casing is held, and rigidly connecting said shafts through said double bevel gear, said first pinion and said cam journal, whereby rotation of said shaft and cam journal when said first pinion and double bevel gear are in engagement will rotate the casing and other shaft at the same speed in the same direction, or, with suitable arrangements of angle of adjustment and gear ratio between said second pinion and said double bevel gear, rotation of the shaft and cam journal when said first pinion and said double bevel gear are disengaged does not rotate the casing or the other shaft.

3. In a two way clutch mechanism, a cylindrical casing, means to rotate said casing, co-acting bearings in said casing, longitudinally disposed arcuately shaped guide grooves in said casing, a shaft in said casing, a cylindrical cam journal fixed to said shaft with its working peripheral face set on an angle to said shaft, a double bevel gear slidably and rotatably mounted on said cam journal, means to prevent relative lateral movement of said gear on said cam journal, a pin in said gear engaging said grooves for holding said gear from rotation relative to said casing but adapted to impart a unitary motion to said gear with said casing, means for holding said casing against rotation, a pinion gear slidably keyed to said shaft to be engaged with or disengaged from said double bevel gear, means to cause said gears to be engaged or disengaged, a second shaft in said casing, a second pinion gear in said casing said pinion gear being fixed to said second shaft and connecting said shaft to said first shaft through said double bevel gear and said cam journal, whereby rotation of either shaft when said first pinion gear is engaging said double bevel gear, will rotate the casing and other shaft in the same direction, or rotation of the shaft and cam journal when said first pinion gear and double bevel gear are disengaged and the casing is held against rotation, will rotate the other shaft in the opposite or reverse direction.

4. In a clutch mechanism, a sectional casing having internal longitudinally disposed arcuately shaped guide grooves therein, means to rotate said casing, bearings in said casing to hold two shafts in axial alignment, a shaft in said casing, a cam journal fixed to said shaft with its peripheral face set on an angle to said shaft, a double bevel gear rotatably mounted on said journal member, means to prevent relative lateral movement of said gear on said journal member, a pin in said gear in engagement with said groove for holding said gear from rotation relative to said casing but adapted to impart a unitary motion to said gear with said casing, means to hold said casing against rotation, a pinion slidably keyed to said shaft to be engaged with or disengaged from said double beveled gear, an elongated hub fixed to said pinion having a spool member formed integral therewith, an annular groove in said spool, arm members formed integral with said hub intermediate said pinion and said spool, rollers carried by said arms, an internal friction band mounted in said casing to be expanded by said rollers, an external friction band mounted on said casing, an operating lever pivotally connected at its lower end and having pins engaging said spool groove, means connecting said lever to said external friction band, a second shaft in said casing, a second pinion in said casing and fixed to said second shaft, connecting said shaft to said first shaft, whereby rotation of either shaft when first said pinion is engaging said double bevel gear will positively rotate the casing and the other shaft in the same direction at the same speed, or with suitable arrangements of angles of adjustment and gear ratio between said second pinion and said double beveled gear rotation of the shaft and cam journal when the casing is held against rotation and the said first pinion and the double beveled gear are disengaged will rotate the other shaft at any desired speed in the opposite direction, according to said gear ratio and angle of adjustment.

5. In a mechanical movement, a rotatably mounted casing having guide grooves therein, means to hold said casing against rotation, a shaft journaled in said casing, a cam journal fixed to said shaft with its peripheral face set on an angle to the axis of said shaft, a toothed gear rotatably mounted on said cam journal, means to prevent relative lateral motion of said gear on said cam journal, means in said gear to prevent rotation of said gear relative to said casing, a second shaft in said casing, a pinion gear fixed to said shaft connecting said shaft to first said shaft, whereby with suitable arrangements of gear ratios, without changing the angle of adjustment, rotation of either shaft when the opposite shaft is held, will rotate the casing at a different speed, the speed transmitted to said casing by said shaft and cam journal differentiating the speed transmitted to said casing by said shaft and pinion, according to said gear ratios.

6. In a mechanical movement, a shaft, a cam journal fixed to said shaft with its peripheral face diagonal to the axis of said shaft, a toothed gear rotatably mounted on said journal, means to prevent relative lateral motion of said gear on said journal, a second shaft, a pinion gear fixed to said shaft connecting said shaft to first said shaft, a casing held against rotation having bearings to maintain said shafts in axial alignment and having an arcuately shaped guide groove therein, means to hold said casing against rotation, a pin in said toothed gear in engagement with said groove to hold said gear from rotation, whereby with suitable arrangements of gear ratios without changing the angle of adjustment, rotation of either shaft will rotate the other shaft at a different speed in the opposite direction and impart an oscillating motion to said pin, or an oscillating motion of said pin will transmit rotation to said shafts simultaneously in opposite directions at different speeds, according to said gear ratios and angle of adjustment.

7. In a mechanical movement, a shaft having a cam journal fixed thereto with its working peripheral face set on an angle to the axis of said shaft, a gear rotatably mounted on said cam journal, means to prevent relative lateral motion of said gear on said cam journal, a casing held against rotation and having coacting bearings to maintain said shaft in alignment therewith and having a longitudinally disposed arcuately shaped guide groove therein, means to hold said casing against rotation, a pin fixed in said gear in engagement with said guide groove to hold said gear against rotation, a trunnion fixed to said gear extending outwardly from said gear at right angles to said shaft and said pin, whereby rotation of said shaft and cam journal will cause said gear to wabble and impart an oscillating motion to said pin and a figure 8 motion to said trunnion, or an oscillating motion of said pin will rotate said shaft and cause said gear to wabble and impart a figure 8 motion to said trunnion.

8. In a mechnical movement, a shaft having a cam journal fixed thereto with its working peripheral face set on an angle to said shaft, a gear rotatably mounted on said cam journal, means to prevent relative lateral motion of said gear on said journal, means adapted to be held against rotation and having co-acting bearings to maintain said shaft in alignment therewith and having a longitudinally disposed arcuately shaped guide groove therein, a pin fixed to said gear in engagement with said guide groove to hold said gear against rotation, a trunnion fixed to said gear extending outwardly from said gear at right angles to said shaft and said pin, whereby an oscillating motion of said pin will rotate said shaft and cause said gear to wabble and impart a figure 8 motion to said trunnion.

9. In a clutch mechanism, a rotatable casing having an arcuately shaped guide groove therein, means to hold said casing against rotation, a shaft in said casing, a cam journal member fixed to said shaft with its peripheral face set on an angle to said shaft, bearings in said casing to maintain said shaft and casing in alignment, a toothed gear loosely mounted on said journal member, means to prevent relative lateral motion of said gear on said journal member, a pin fixed to said gear to engage said guide groove, a pinion gear slidably keyed to said shaft, means to cause said pinion to be engaged with or disengaged from said toothed gear, whereby rotation of said shaft and cam journal member will rotate said casing at the same speed when said pinion and toothed gear are in engagement, or when said pinion and toothed gear are disengaged, said casing may be rotated or held against rotation independent of said shaft rotation.

10. In a reduction gearing, a stationary casing or gear box having coacting bearings to maintain two shafts in axial alignment and having internal longitudinally disposed arcuately shaped guide grooves therein, means to maintain said box stationary, a shaft in said gear box, a cam journal member mounted on and fixed to said shaft with its working peripheral face set on an angle to said shaft, a toothed gear loosely mounted on said journal member, means to prevent relative lateral movement of said gear on said journal member, a pin fixed to said gear in engagement with said groove to hold said gear against rotation, a second shaft in said gear box, a pinion gear fixed to said shaft connecting said shaft to said first shaft through said toothed gear and said journal member, whereby with suitable arrangements of gear ratios and angle of adjustment, rotation of said shaft and cam journal member will rotate the other shaft at any desired reduced speed according to said gear ratio and angle of adjustment.

11. In a mechanical movement, a rotatably mounted casing having longitudinally disposed arcuately shaped guide grooves therein, bearings in said casing to hold two shafts in axial alignment, a shaft journaled in said casing having a cam journal member formed integral therewith or fixed thereto with its working peripheral face set on an angle to said shaft, a double bevel gear slidably and rotatably mounted on said journal member, means in said gear in engagement with said grooves to hold said gear from rotation relative to said casing but adapted to impart a unitary motion to said casing with said gear, a pinion gear slidably keyed to said shaft to be engaged with or disengaged from said double gear, an operating lever and means associated therewith to cause said pinion to be engaged with or disengaged from said double gear, a second shaft in said casing, a second pinion gear fixed to said shaft connecting said shaft to said first shaft through said double bevel gear and said first pinion gear, whereby when said first shaft and cam journal member is rotated an endwise motion of said lever toward the casing will cause said first pinion to engage the said double gear and positively rotate the casing and the other shaft, or an endwise movement of said lever away from said casing will disengage said first pinion and double bevel gear and rotation of either shaft when said first pinion and double bevel gear are disengaged and the opposite shaft held against rotation, will rotate the casing at a speed in the same direction according to the gear ratio of said double bevel gear and said second pinion meshing therewith.

12. In mechanical movements, a rotatably mounted casing having guide grooves therein, bearings in said casing to hold two shafts in axial alignment, a shaft journaled in said casing having a cam journal member formed integral therewith or fixed thereto with its working peripheral face set on an angle to said shaft, a double bevel gear rotatably mounted on said journal member and having means in engagement with said grooves to hold said gear against rotation relative to said casing but adapted to impart unitary motion to said casing with said gear, means to hold said casing against rotation, a pinion gear slidably fixed to said shaft to be engaged with or disengaged from said double bevel gear, an internal friction band mounted in said casing, means to prevent relative longitudinal movement of said band in said casing, an operating lever and means associated therewith to cause said band to be expanded and said pinion to be engaged with or disengaged from said double bevel gear, a second shaft journaled in said casing, a pinion gear fixed to said second shaft connecting said shaft to said first shaft through said double bevel gear, said cam journal member and said first pinion gear, whereby an endwise movement of said operating lever and its associated structure when the shaft and cam journal member are rotated will rotate said casing and other shaft through said internal friction band, and further endwise movement of said lever will cause said first pinion gear to engage the double bevel gear and positively rotate said casing and the other shaft at the same speed as said shaft and cam journal member, or rotation of either shaft when said first pinion gear and said double bevel gear are disengaged and said internal friction band in normal position and the opposite shaft is held against rotation, will rotate the casing at a speed in the same direction according to the gear ratio of said double bevel gear and said second pinion gear meshing therewith.

In testimony whereof I affix my signature.

JOSEPH S. CURRAN.